Jan. 28, 1964  W. S. WRIGHT ETAL  3,119,262
FLOW INDICATOR
Filed Nov. 8, 1961
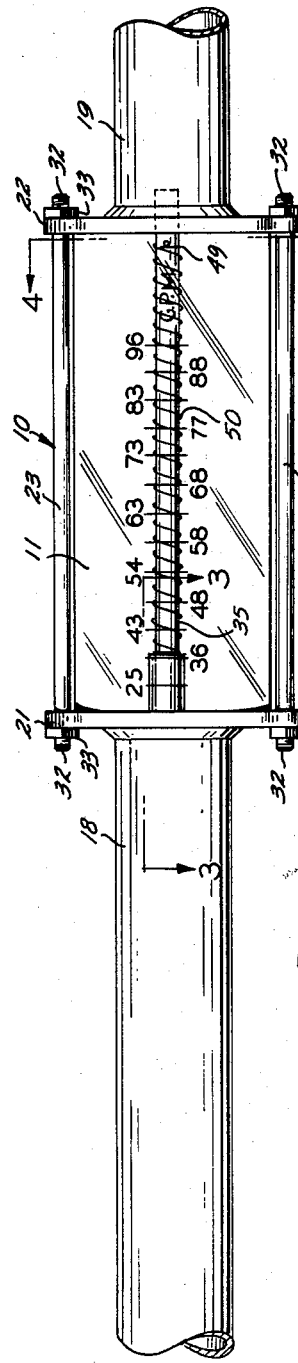
FIG. 1
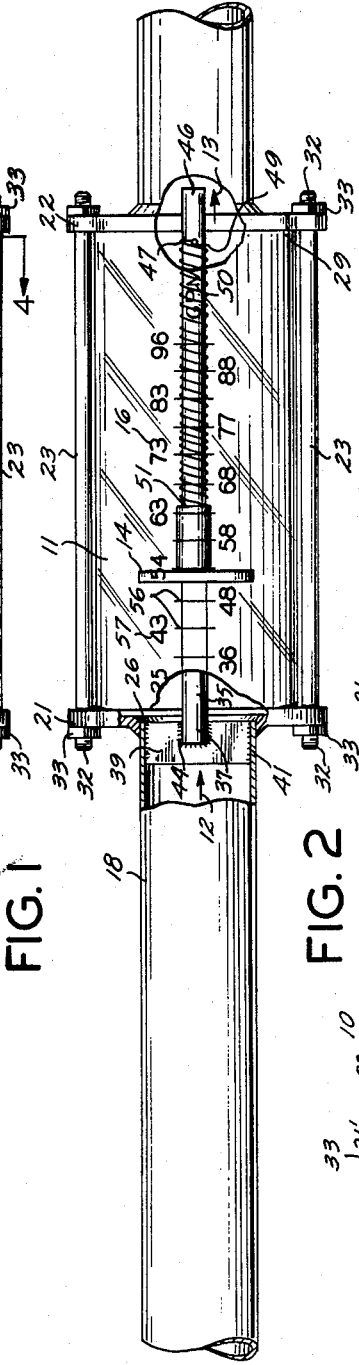
FIG. 2
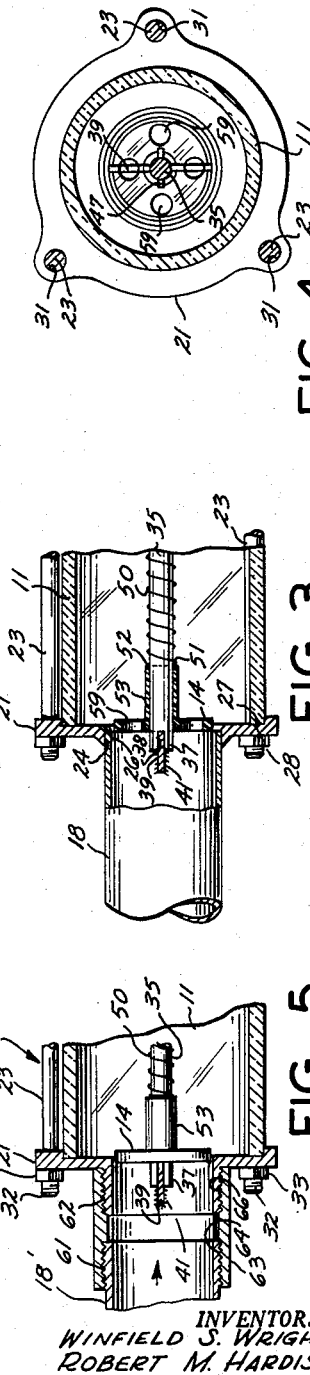
FIG. 4
FIG. 3
FIG. 5
INVENTORS.
WINFIELD S. WRIGHT
ROBERT M. HARDISON
BY
R. E. Geaugue
ATTORNEY

United States Patent Office 3,119,262
Patented Jan. 28, 1964

3,119,262
FLOW INDICATOR
Winfield S. Wright, 22226 Roscoe Blvd., Canoga Park, Calif., and Robert M. Hardison, 15542 Chatsworth Blvd., Mission Hills, Calif.
Filed Nov. 8, 1961, Ser. No. 151,058
7 Claims. (Cl. 73—228)

This invention relates to indicators and more particularly to a flow indicator useful for instantly, accurately and visually indicating the flow of a liquid through a pipe.

This invention is advantageously applicable to hydraulic systems for measuring and indicating the flow of liquids therethrough and is especially useful for measuring the flow of a liquid in a hydraulic system of a pool, or the like, having a filter, to indicate the condition of the filter wherein an appreciable decrease in fluid velocity indicates the necessity for replacing or cleaning the filter.

This invention comprises a transparent chamber adapted to receive a flow of a liquid in the system therethrough, the chamber having a movable vane member axially movable in response to velocity of a liquid passing through the chamber and visible through the wall of the chamber during its movement to indicate its movement relative to indicia provided on the transparent wall. The vane member is movable on a shaft and is transversely mounted thereon for resistance to a drag force supplied thereto by the flow of the liquid. By virtue of its construction, being appreciably smaller than the inner diameter of the chamber and preferably perforated, a minimal drag force is effected against the flow of the liquid so as to instantly and more accurately indicate the rate of flow of the fluid yet effect a minimal turbulence and pressure drop in the system.

It is therefore an object of this invention to provide a new and improved flow indicator for intercepting the flow of liquid through a pipe or hydraulic system for instantly and more accurately measuring and indicating the flow of the liquid.

Another object of this invention is to provide a new and improved flow indicator having a simplified construction which is easily and readily adaptable to most hydraulic systems.

Still another object of this invention is to provide a new and improved flow indicator which measures the flow of a liquid and clearly visually indicates the flow.

Yet another object of this invention is to provide a new and improved flow indicator which is economical to manufacture and is capable of mass production.

Still a further object of this invention is to provide a new and improved flow indicator which is readily adjustable to compensate for variance of viscosity of liquids by replacement of selective parts thereof.

A general object of this invention is to provide a new and improved flow indicator of the character described which overcomes disadvantages of prior means and methods heretofore intended to accomplish generally similar purposes.

These and other objects of this invention will be more apparent from the ensuing detailed description, drawings and appended claims.

In the drawings:

FIGURE 1 is a plan view, in elevation, of the flow indicator of this invention;

FIGURE 2 is a plan view, similar to FIGURE 1, with parts broken for greater clarity;

FIGURE 3 is a vertical, cross-sectional view as taken substantially along the line 3—3 of FIGURE 1;

FIGURE 4 is a vertical, cross-sectional view as taken substantially along the line 4—4 of FIGURE 1; and FIGURE 5 is a fragmentary, vertical, cross-sectional view, similar to FIGURE 3, illustrating another embodiment of this invention.

Referring in detail to the drawings, there is shown by way of illustration, but not of limitation, a flow indicator designed and constructed in accordance with this invention and generally designated by the numeral 10. The flow indicator 10 generally comprises a tubular body 11, preferably of a cylindrical configuration adapted for a flow of liquid therethrough as indicated by the arrowed lines 12 and 13, the inlet being at 12 and the outlet at 13, for measuring thereof by vane means 14 movably mounted in the body 11 for axial movement relative thereto whereby the axial movement of the vane means 14 is translated for visual indication by indicia 16 printed, etched, or otherwise imposed on the wall of the body 11.

The cylindrical body 11 is appreciably larger in diameter than the pipe through which the liquid flows and the outer diameter of the vane means 14 so as to effect a minimal turbulence and decrease in velocity and pressure of the liquid. The body 11 is tubular, defining a chamber of cylindrical or other configuration and is formed of a suitable transparent material, such as plastics, ceramics, or the like. To secure the body 11 to the pipe, the pipe herein being illustrated as a pair of pipe sections 18 and 19 intersected by the body 11, each pipe section is provided with an outwardly extending transverse annular flange 21 and 22, respectively, through which a plurality of elongated tie bolts 23 extends.

As best seen in FIGURE 3, the flange 21 includes a central opening 24 in which the end 26 of the pipe section 18 is secured, as by sweat soldering, welding, or the like. An annular recess 27 is formed on the inner face of the flange 21 in which an annular end 28 of the body 11 is seated. The flange 22 is similarly formed with an annular recess in which the opposite annular end 29 of the cylindrical body 11 is seated and a central opening similar to the opening 24 in which the outer end of the pipe section 19 is similarly fixed as by sweat soldering, welding, or the like. The tie bolts 23 extend through aligned apertures 31 of the flanges 21 and 22 and include threaded outer ends 32 on which nuts indicated at 33 are threaded to clamp the flanges 21 and 22 therebetween. In this manner, as the nuts 33 are tightened, the flanges 21 and 22 bear tightly against the annular ends 28 and 29 of the cylindrical body 11 to effect a leakproof securement thereto. If desired, gaskets, not shown, may be interposed between the annular ends 28 and 29 and respective relieved faces like 27. Therefore, liquid flowing through the pipe section 18 in the direction of the arrowed line 12 flows into the interior of the body 11, through the body and is discharged outwardly thereof through the pipe section 19 as indicated by the arrowed line 13.

The vane means 14 is axially movable on a shaft 35 mounted in the body and having its longitudinal axis substantially concentric with the longitudinal axis of the body 11. One end 37 of the shaft 35 is bifurcated as indicated at 38 for straddling a support means 39 fixed transversely in the pipe section 18 and adjacent to the end 26 thereof. The support means 39 is in the form of a relatively thin web fixed to the tube section 18 as by welding, soldering, or the like, indicated at 41 leaving fluid free to flow therearound and into the interior of the body 11. The bifurcated end 37 of the shaft 35 is fixed to a central portion of the web 39 as by welding, soldering, or the like, indicated at 44 so as to support the shaft 35 with its axis substantially coincident with the longitudinal axis of the body 11 and of the pipe sections 18 and 19. The opposite end 46 of the shaft 35 may be free as indicated or otherwise suitably supported within the inner end of the pipe section 19.

A stop member in the form of a pin 47 is transversely mounted to the shaft 35 and adjacent to the outlet end of the body 11 for abutment with one end 49 of a helical compression spring 50 surrounding the shaft 35 and having an opposite end 51 abutting an outer end 52 of a boss 53 secured to or formed integrally with the vane member 14. The spring 50 biases the vane member 14 into a normal position illustrated in FIGURE 3 wherein the vane member 14 abuts the transverse web 39. In response to flow of liquid admitted into the body 11 from the pipe section 18, a drag force is applied to the vane member 14 to overcome the expansion force of the spring 50 and biases the vane member in a direction towards the outlet pipe section 19 as illustrated in FIGURE 2.

The axial movement of the vane member relative to the shaft 35 and to the body 11 is directly proportional to the velocity of the flow of the liquid. A plurality of spaced lines 56, with associated numerals 57, forming the indicia 16, overlie the path of movement of the vane means 14 and are so calibrated as to visually indicate on the exterior of the body 11 a reading of the fluid flow by virtue of the fact that the peripheral edge of the vane means 14 is visible through the transparent body 11 as it moves through the body. The numerals 57 are shown as representing gallons per minute, although it will be readily understood that other suitable indicia may be used.

The outer diameter of the vane means 14 is preferably appreciably smaller than the interior of the body 11 so as to effect a minimal turbulence and pressure drop of the flow of liquid through the body. In other words, since the diameter of the vane means 14 is approximately equal to the diameter of pipe section 18 and is almost one-half the diameter of the body 11, it is apparent that the flow passage around the vane means and between the perimeter of the vane means and the inner wall of body 11 is greater than the flow area of the pipe section 18, thereby producing no restriction to fluid flow and no unwanted pressure drop. Additionally, a plurality of apertures 59 preferably extend transversely through the vane 14 to decrease resistance to the flow of the liquid and thereby decrease the amount of movement of the vane in response to the flow of the liquid.

The movement of the vane 14 may be varied by varying the diameter of the apertures like 59 whereby the indicating means may be adjusted by removing a vane 14 having apertures of given diameter and replacing it with a similar vane member having apertures of different diameter to compensate for use of the flow indicator 10 with liquids of different viscosity. Optionally, to adjust the flow indicator 10, the spring 50 may be removed and replaced by a different spring having a greater or lesser biasing force if desired. The vane 14 and/or the spring 50 may be easily and quickly removed and replaced by removal of selective nuts 33 to release the tie rods 23 and removing the body 11 to provide access to the free end 46 of the shaft 35. The stop member 47 is preferably in the form of a cotter pin which may be easily and readily removed from the shaft 35, after which the spring 50 and/or the vane member 14 may be removed and replaced.

FIGURE 5 illustrates a slightly modified embodiment of this invention, in which the flanges 21 and 22, one being indicated at 21′, may be adapted for removable installation to the pipe sections like 18 and 19. In the instant embodiment, the pipe section 18′ having external threads 61 may be secured to an externally threaded boss 62 formed integrally with or secured to the flange 21′ by a connector 63 having internal threads like 64 and 66 threadable therewith. The instant embodiment 10′ is identical to the first embodiment in all other respects with the flange 21′ secured similarly to the body 11 as by the tie bolts 23. To mount the shaft 35, the support means 39 may be internally secured in the boss 62 as by soldering, welding, or the like.

The operation in both embodiments is substantially identical. Liquid flowing in the direction of the arrowed line 12, is directed against the vane member 14 which creates a drag force thereagainst resulting in movement of the vane 14 against the bias of the spring 50 and along the axis of the shaft 35 in accordance with the velocity of the flow of liquid. The vane 14 is easily and readily observed through the transparent wall of the body 11 and a reading clearly indicated by the indicia 16.

Although the body 11 has been described herein as being cylindrical in configuration, it is to be understood that it may be otherwise configurated, if desired, and not limited thereto.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claims.

What is claimed as new and desired to secure by Letters Patent is:

1. A flow indicator for measuring the flow of fluid through a conduit comprising: a tubular body connected to said conduit in the path of said flow; shaft means supported in said body and having its axis substantially coincident with the longitudinal axis of said tubular body; disk-shaped vane means slidably mounted on said shaft means for axial movement relative to said body, said vane means having a diameter approximately equal to the diameter of said conduit and said body having a diameter exceeding the diameters of said vane means and said conduit sufficiently that the flow area between the perimeter of said vane means and said body is at least equal to the flow area of said conduit, thereby minimizing restriction to said flow; spring means biasing said vane means towards one end of said shaft means, said vane means being movable against the bias of said spring means in a direction towards an opposite end of said shaft means in response to the velocity of flow of said fluid through said body; and visible indicating means for indicating the amount of axial movement of said vane means relative to said body so as to measure the fluid flow therethrough.

2. A flow indicator for measuring the flow of fluid through a conduit comprising: a tubular body of transparent material connected to said conduit in the path of said flow; shaft means supported in said body and having its axis substantially coincident with the longitudinal axis of said tubular body; disk-shaped, perforated vane means slidably mounted on said shaft for axial movement relative to said body, said vane means having a diameter approximately equal to the diameter of said conduit and said body having a diameter exceeding the diameter of said pipe sufficiently that the flow area between the perimeter of said vane means and said body exceeds the flow area of said conduit, thereby minimizing restriction to fluid flow; spring means surrounding said shaft for biasing said vane means towards one end of said shaft means, said vane means being movable against the bias of said spring means in an opposite direction in response to the velocity of flow of said fluid through said body; and visible indicating means mounted on said body for indicating the amount of axial movement of said vane means relative to said body so as to measure the fluid flow therethrough.

3. In combination with first and second pipe sections forming a flow path for fluid to be measured, a flow indicator comprising: a tubular body of transparent material having a reduced inlet connected to one of said pipe sections and a reduced outlet connected to the other of said pipe sections and forming a continuous flow path with said pipe sections; shaft means mounted in said body and having its axis substantially coincident with the major axis of said body; means rigidly supporting one end of said shaft means in one of said pipe sections, a disk-shaped vane having an outer diameter substantially equal to the diameter of said inlet movably mounted on said shaft means for axial movement relative to said body in one direction in response to drag force supplied by the flow of said fluid through said body, said body having a diameter almost twice the diameter of said vane, whereby the flow area between the perimeter of said vane and said body exceeds the flow area of said inlet; stop means fixed on said shaft means adjacent to said outlet of said body; spring means surrounding said shaft having one end abutting said vane and an opposite end abutting said stop means for biasing said vane in one direction to a position adjacent to said inlet of said body; and visible indicia means on said body overlying the path of said vane for indicating the amount of axial movement of said vane relative to said body so as to measure the fluid flow.

4. A flow indicator as defined in claim 3, wherein said vane is perforated.

5. In combination with a conduit forming a flow path for a fluid, a flow indicator comprising:

a body member connected to said conduit, said body member having an encompassing sidewall forming a continuation of said flow path;

disk-shaped vane means reciprocally mounted in said body member, said vane means having a diameter approximately equal to the diameter of said conduit and said body member having a diameter exceeding the diameters of said vane means and said conduit sufficiently that the flow area between the perimeter of said vane means and said encompassing sidewall is at least equal to the flow area of said conduit, thereby minimizing restriction to fluid flow;

spring means biasing said vane means toward one end of said body member, said fluid moving said vane means against the bias of said spring means an amount proportional to the velocity of flow of said fluid; and indicating means mounted on said body member for indicating the amount of movement of said vane means against said bias.

6. The combination of claim 5 wherein the diameter of said body member is approximately twice the diameter of said vane means.

7. The combination of claim 6 wherein said vane means is perforated.

References Cited in the file of this patent

UNITED STATES PATENTS

| 828,108 | Graham | Aug. 7, 1906 |
| 1,819,138 | Trogner | Aug. 18, 1931 |
| 3,040,577 | Rubenstein | June 26, 1962 |

FOREIGN PATENTS

| 645,490 | Great Britain | Nov. 1, 1950 |